US009374183B2

(12) United States Patent
Anniballi et al.

(10) Patent No.: US 9,374,183 B2
(45) Date of Patent: Jun. 21, 2016

(54) BROADCAST SOURCE IDENTIFICATION BASED ON MATCHING VIA BIT COUNT

(71) Applicant: Clear Channel Management Services, Inc., San Antonio, TX (US)

(72) Inventors: Dyon Anniballi, Wayne, PA (US); Philippe Generali, Scarsdale, NY (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 250 days.

(21) Appl. No.: 13/897,155

(22) Filed: May 17, 2013

(65) Prior Publication Data

US 2013/0254793 A1 Sep. 26, 2013

Related U.S. Application Data

(63) Continuation-in-part of application No. 13/221,237, filed on Aug. 30, 2011, now Pat. No. 8,639,178.

(51) Int. Cl.
*H04N 7/173* (2011.01)
*H04H 60/65* (2008.01)
*H04H 60/37* (2008.01)
*H04H 60/64* (2008.01)

(52) U.S. Cl.
CPC ............... *H04H 60/65* (2013.01); *H04H 60/37* (2013.01); *H04H 60/64* (2013.01); *H04H 2201/90* (2013.01)

(58) Field of Classification Search
CPC ............ H04N 21/222; H04N 21/2221; H04N 21/23418; H04N 21/237; H04N 21/26603
See application file for complete search history.

(56) References Cited

U.S. PATENT DOCUMENTS

| | | | |
|---|---|---|---|
| 5,437,050 | A | 7/1995 | Lamb et al. |
| 6,834,308 | B1 | 12/2004 | Ikezoye et al. |
| 6,990,453 | B2 | 1/2006 | Wang et al. |
| 7,174,293 | B2 | 2/2007 | Kenyon et al. |
| 7,194,752 | B1 | 3/2007 | Kenyon et al. |

(Continued)

FOREIGN PATENT DOCUMENTS

| | | |
|---|---|---|
| WO | WO 01/62004 | 8/2001 |
| WO | WO 02/11123 | 2/2002 |

(Continued)

OTHER PUBLICATIONS

Patel, Kuner; "Your Smartphone is Listening in While You Watch TV", Advertising Age, Jul. 18, 2001, http://adage.com/print/228760.

*Primary Examiner* — John Schnurr
(74) *Attorney, Agent, or Firm* — Garlick & Markison; Edward Marshall

(57) ABSTRACT

An end user can sample a radio or television broadcast, generate a user representation of the broadcast sample, and send the user representation to a comparison system, which also receives known representations of content broadcast by multiple different stations. The known representations are stored in a continuous fashion, and represent actually broadcast content. The comparison system identifies the source of the broadcast sample by comparing the user representation to the known representations associated with each of the different stations using a bit count method, such as the Hamming distance. By comparing two representations of content that was actually broadcast, a broadcast source can be identified without requiring the use of watermarks, timestamps, or a database of discreet content items.

19 Claims, 7 Drawing Sheets

(56) References Cited

U.S. PATENT DOCUMENTS

| | | | |
|---|---|---|---|
| 7,346,512 | B2 | 3/2008 | Wang et al. |
| 7,359,889 | B2 | 4/2008 | Wang et al. |
| 7,500,007 | B2 | 3/2009 | Ikezoye et al. |
| 7,627,477 | B2 | 12/2009 | Wang et al. |
| 7,739,062 | B2 | 6/2010 | Wang |
| 7,783,489 | B2 | 8/2010 | Kenyon et al. |
| 7,788,279 | B2 | 8/2010 | Mohajer et al. |
| 7,853,664 | B1 | 12/2010 | Wang et al. |
| 7,865,368 | B2 | 1/2011 | Wang et al. |
| 7,870,574 | B2 | 1/2011 | Kenyon et al. |
| 7,881,657 | B2 | 2/2011 | Wang et al. |
| 7,917,645 | B2 | 3/2011 | Ikezoye et al. |
| 2002/0072982 | A1 | 6/2002 | Barton et al. |
| 2002/0161741 | A1 | 10/2002 | Wang et al. |
| 2004/0199387 | A1 | 10/2004 | Wang et al. |
| 2005/0267817 | A1 | 12/2005 | Barton et al. |
| 2007/0014377 | A1 | 1/2007 | Pirak et al. |
| 2007/0143777 | A1* | 6/2007 | Wang .............................. 725/18 |
| 2007/0274537 | A1* | 11/2007 | Srinivasan ................... 381/94.3 |
| 2008/0082510 | A1 | 4/2008 | Wang et al. |
| 2008/0205506 | A1 | 8/2008 | Hickey |
| 2009/0012849 | A1 | 1/2009 | Barton et al. |
| 2009/0205000 | A1* | 8/2009 | Christensen et al. ........... 725/61 |
| 2010/0030775 | A1 | 2/2010 | Mohajer et al. |
| 2010/0145708 | A1 | 6/2010 | Master et al. |
| 2011/0071838 | A1 | 3/2011 | Wang et al. |
| 2011/0078719 | A1 | 3/2011 | Kenyon et al. |
| 2011/0099197 | A1 | 4/2011 | Wang et al. |
| 2011/0153621 | A1 | 6/2011 | Beltas et al. |
| 2011/0276157 | A1 | 11/2011 | Wang et al. |
| 2013/0006951 | A1* | 1/2013 | Yu ..................... G06F 17/30784 707/706 |
| 2013/0326573 | A1* | 12/2013 | Sharon ................... H04H 60/59 725/115 |

FOREIGN PATENT DOCUMENTS

| | | |
|---|---|---|
| WO | WO 02/27600 | 4/2002 |
| WO | WO 02/061652 | 8/2002 |
| WO | WO 03/091990 | 6/2003 |
| WO | WO 2005/079499 | 9/2005 |
| WO | WO 2006/012241 | 2/2006 |
| WO | WO 2007/059420 | 5/2007 |
| WO | WO 2008/042953 | 4/2008 |

* cited by examiner

BROADCAST SOURCE IDENTIFICATION BASED ON MATCHING VIA BIT COUNT

CROSS REFERENCE TO RELATED APPLICATIONS

This application is a continuation-in-part of U.S. application Ser. No. 13/221,237, filed Aug. 30, 2011, and entitled "BROADCAST SOURCE IDENTIFICATION BASED ON MATCHING BROADCAST SIGNAL FINGERPRINTS,", issued as U.S. Pat. No. 8,639,178, on Jan. 28, 2014, which is incorporated herein in its entirety by reference for all purposes.

FIELD

The present disclosure relates generally to broadcasting, and more particularly to identifying broadcast sources based on matching broadcast signals.

BACKGROUND

Current technology allows a portion of a song, movie, or other unknown content items to be identified by comparing it against a database of known content. To facilitate identification of the unknown content, it is known to generate fingerprints of both the known and unknown content items, and compare the fingerprints. These fingerprints can include audio watermarks. In cases where fingerprints are used, the database of known content is sometimes used to store fingerprints of distinct content items.

In some instances, the database storing the fingerprints of the known content is also used to store timestamps, indicating particular times at which particular items of known content were broadcast. The unknown content can also include timestamps, and by performing a two step comparison that matches both the fingerprints and the timestamps of unknown distinct content items with the fingerprints and timestamps stored in the database of known content items, information can be deduced about a source of the unknown content item.

Currently available technology, however, requires having a comprehensive database of known content items to be compared against each unknown content item, because if an unknown content item is not included in the database of known content items, any attempt to identify the unknown content item will be unsuccessful. For this and other reasons, currently available technology is less than ideal.

SUMMARY

Disclosed herein are various methods, systems, and devices capable of identifying a broadcast source by comparing a representation of a portion of a current broadcast obtained by a mobile phone or other end-user device, with multiple different representations of current broadcast content from multiple different sources. An end user can sample or record part of a radio or television broadcast he is observing, generate a user's representation of the broadcast sample, and send the user's representation to a comparison system, such as a server or computing device. The server stores, temporarily or otherwise, a continuous representation of broadcasts from multiple different stations. The server can identify the station being observed by the end user in near-real time by comparing the user's representation of the broadcast sample with representations of known continuous broadcast content from the different stations. The representations of known continuous broadcast content can be generated and transmitted to the server in contemporaneously with the actual broadcast of the content, and essentially buffered, or stored in a continuous fashion for a desired period of time. Various embodiments can identify a broadcast source without requiring the use of watermarks inserted into broadcast content, without requiring the use of timestamps, and without requiring a large database of known content items.

At least one embodiment is implemented as a method that includes receiving broadcasts from multiple broadcast sources. Each of the broadcast sources includes broadcast content, which in some embodiments includes multiple programming elements. The method also includes determining first spectral data for each broadcast source. The first spectral data represents the spectral content of the broadcast content received from each of the broadcast sources. The spectral data can be stored in a data buffer, where the data in the buffer represents substantially current broadcast content.

Spectral data representing a portion of a substantially current broadcast from one of the broadcast sources can be received from an endpoint communication device, and compared to the spectral data temporarily stored in the data buffer. Based on the comparison between the spectral data provided by the endpoint communication device and the spectral data stored in the buffer, one or more broadcast sources can be identified as a matching broadcast source.

In some embodiments, the spectral data to be stored in the buffer is generated for each one of the plurality of broadcast sources contemporaneously with receipt of the broadcasts. In many cases the spectral data stored in the buffer includes spectral data representing substantially all broadcast content associated with the respective one of the plurality of broadcast sources intended for human-perceptible reproduction. In various embodiments of this type, metadata and other data not intended to be listened to or viewed by the broadcast audience is not included in the spectral data. In some instances a recording of an audible (or visual) presentation of the broadcast content made during the broadcast and spectral data representing the portion of the broadcast recorded can be generated.

The data stored in the buffer represents an actual, substantially continuous broadcast including a series of broadcast programming elements, as opposed to data representing a song or television show, which may or may not be broadcast in its entirety, or which may be broadcast in non-contiguous segments. The broadcast programming elements can, in some cases, include both primary content elements, such as songs, and additional content, such as voiceovers, alterations, commercials, or overlays. In performing a comparison of the data from the end user's device and the data stored in the buffer, a broadcast source match can, in some cases, be determined based on data representing the additional content.

Various methods described herein can be implemented by one or more devices that include a processor, at least one communications interface, a buffer, memory, and a program of instruction to be stored in the memory and executed by the processor. Such devices include server computers, workstations, distributed computing devices, cellular telephones, broadcast monitoring recorders, laptops, palmtops, and the like. Some embodiments can be implemented, for example, using a server computer to perform matching operations, field recording devices for obtaining known broadcast content, and end-user devices to capture broadcast content for comparison and use in identifying a broadcast source.

Other methods described herein include using an endpoint communication device to obtain first spectral data representing a portion of broadcast content currently being received by the endpoint communication device. The spectral data is transmitted, in some cases at substantially the same time as the spectral data is obtained, to a server that identifies a broadcast source of the portion of the broadcast by comparing the spectral data from the endpoint device with spectral data representing substantially current broadcast content from a plurality of broadcast sources. Various embodiments also include capturing a perceptible presentation of the portion of the broadcast (e.g. audio or video), and analyzing the spectral content of the perceptible presentation. After the broadcast source is identified, information associated with the broadcast source can be delivered to the endpoint communication device.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
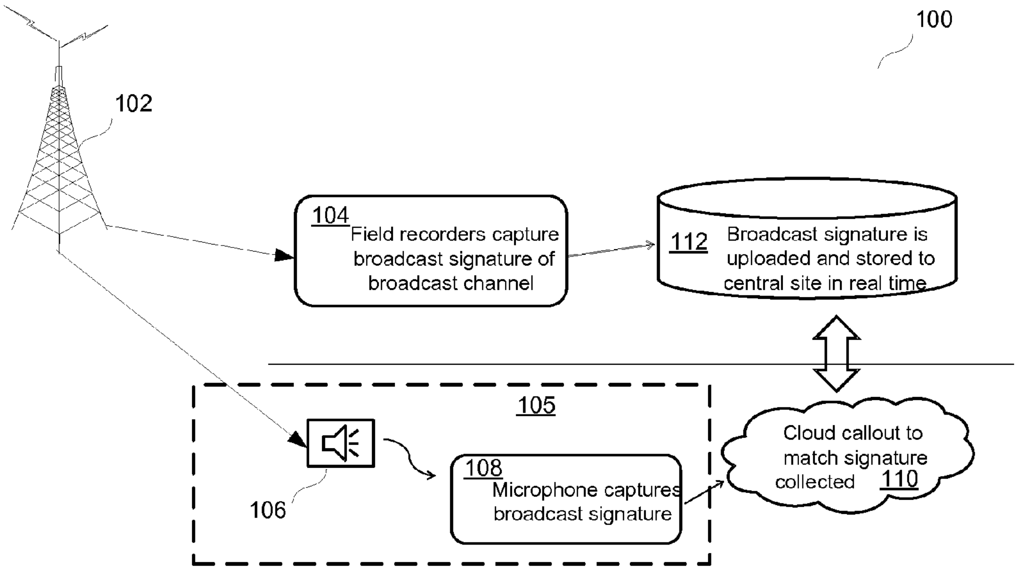
FIG. 1 is a diagram illustrating collection of known and unknown broadcast content signatures according to various embodiments of the present disclosure.

Referring first to FIG. 1, a system 100 useful for identification of a particular broadcast channel, station, or source being observed by a user will be discussed. System 100 includes one or more broadcast sources 102, such as a broadcast radio station, television station, streaming video or audio channel, or other content broadcast for consumption by end-users, or others. As used herein, the term "broadcast" is intended to be interpreted in a broad sense, and includes broadcasts in various different mediums, including broadcasts made via the Internet and other communication networks, analog and digital radio frequency broadcasts such as those broadcasts made by terrestrial and satellite radio and television stations, and transmissions intended for consumption of more than one person or device made in any other suitable medium.

End-users, for example individual consumers and businesses, can use a mobile device 105, such as a tablet, personal digital assistant, mobile phone, or another device equipped with or connected to microphone 106 to record the broadcast content currently being consumed by the end-user. The broadcast content captured by microphone 106 can be analyzed to identify a broadcast signature, sometimes referred to as a fingerprint and including various representations of the broadcast content, using circuitry or a processor implementing a software module 108. The broadcast signature, or fingerprint, can be transmitted via a communication network that includes a cloud computing component 110. In some embodiments, although not specifically illustrated in FIG. 1, a device other than mobile device 105 can be used to generate the signature of the broadcast content captured by microphone 106.

At the same time the user is capturing and determining the signature of the content broadcast by broadcast source 102, field recorders 104 can be used by a monitoring service, service provider, or the like to capture a comparison signature of the same broadcast content. Thus, there are two representations of the content broadcast by broadcast source 102: a first unknown representation received by mobile device 105; and a second known representation of the same content received by field recorders 104. The comparison signature captured by field recorders 104 can be delivered to repository 112, which can be a central or regional server system, data storage site, service provider computer system, storage local to the field recorders, or another suitable data handling system. The comparison signature corresponding to the content broadcast by broadcast sources 102 is temporarily stored in a buffer, or other memory, in a continuous, sequential manner similar to the way data is stored in a buffer, for example, but not limited to, a FIFO (first-in-first-out) or LIFO (last-in-first-out) buffer. The comparison signature stored in repository 112 can then be used for comparison with the broadcast signature record by end-user's mobile device 105.

The broadcast content representations temporarily stored in repository 112 corresponds to fingerprints of essentially continuous real-time broadcast content, which includes not only signatures of discrete items like songs, videos, images, and the like, but can also include unanticipated, unscripted, or content that may be unknowable until the broadcast is generated. Note that the data stored in repository 112 is, in at least some embodiments, not simply a database of fingerprints, with records corresponding to discreet content items, although some implementations can employ a database of individual content items in addition to the continuous fingerprint described herein. Furthermore, the temporarily stored, continuous broadcast content signature can include, audio signatures of advertisements, disc jockey chatter, listener or viewer telephone calls, real-time or custom mixed audio content that may include signatures of both prerecorded songs and live content, or the like.

By generating a signature that represents the entire broadcast stream intended to be presented to a user, the broadcast signature captured by mobile device 105 can be compared to the broadcast signature recorded by field recorders 104, thereby allowing identification of a station broadcasting the content, regardless of whether an actual song can be identified based on that same information. For example, if an audio signature of a song stored in a database is compared to audio captured by an end-user's mobile device 105, the audio captured by end-users mobile device may not correlate with any song stored in a database storing signatures of discreet songs, for a number of reasons: the captured audio may include both the song and other content broadcast concurrently with that song; the captured audio may simply not be a song; or the captured audio may be audio of a song not included in the database to which is compared. But various embodiments of the present disclosure identify a broadcast radio station even when there is no match between a song stored in the database and audio captured by the end-users mobile device 105, because the audio captured by the end-users mobile device 105 is compared against audio captured by field recorders 104. Thus, the signatures recorded by both the field recorders 104 in the end-users mobile device 105 can be matched, regardless of whether the signature of audio captured by mobile device 105 corresponds to an advertisement, or not stored in a database of signatures.

Figure 2:
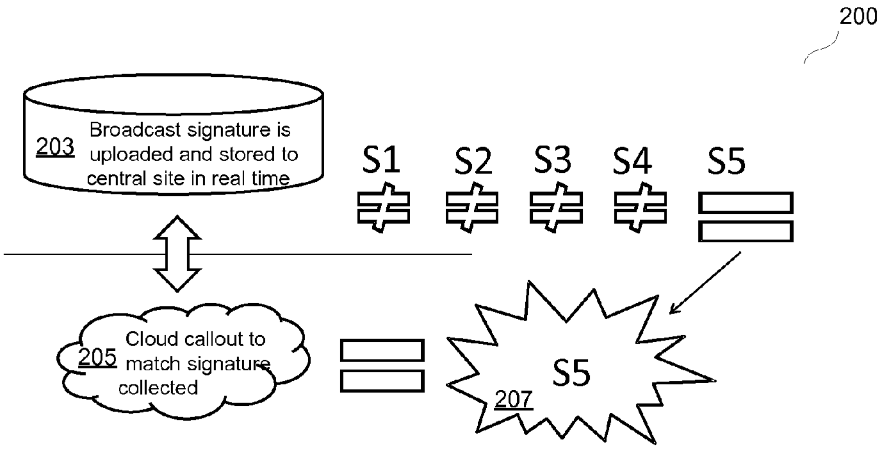
FIG. 2 is a diagram illustrating comparison of known and unknown collected broadcast signatures according to various embodiments of the present disclosure.

Referring next to FIG. 2, a system 200 that allows identification of a particular station from among multiple different broadcast stations will be discussed according to various embodiments of the present disclosure. A server 203, which may be a regionally located server, a nationally located server, a server local to a sub community, or some other computing and storage device or system, is used to buffer a desired amount of audio content from multiple different broadcast stations. In the illustrated example, server 203 includes buffered content signatures corresponding to five different radio stations, S1, S2, S3, S4, and S5. The content from each station is, in at least one embodiment, stored in a different buffer or memory location to permit parallel comparison of the signature to be identified with the signatures for each of the radio stations.

Content recorded by an end-user is delivered to a cloud callout routine 205, which compares the signature of the audio captured by the end-user with the signature of the audio captured from each of the broadcast stations S1-S5. Although a cloud callout routine 205 is illustrated, the matching of signatures can be performed at any of various computing elements, according to various system implementations.

In the example illustrated in FIG. 2, a comparison of the signature captured by the end user can be compared against each of the buffers corresponding to stations S1-S5, results in a match between the audio content recorded by the end-users mobile device and the broadcast content signature of station S5. In rare cases, for example where two stations in the same regional market broadcast identical content with a time delay shorter than the time-length of the signature stored in each of the buffers holding the known broadcast content, the signatures from the two stations may both match the signature of the broadcast content to be provided.

It will be appreciated that although when discussing FIGS. 1 and 2 a cloud callout module has been used for purposes of discussion, various embodiments do not require use of cloud computing techniques. For example, the comparison between the broadcast signatures of stations S1 through S5 and the broadcast signature of the recorded audio sample from the end-user could be compared at the same computing device used to buffer the broadcast signatures. In other embodiments various networked computers connected via a local area network (LAN) a wide-area network (WAN), a backbone network, in any of various wired and wireless subnetworks can be used to perform a comparison either alone or in combination with other networked computers or other devices.

Referring again to FIG. 1, in at least one embodiment both field recorders 104 and mobile device 105 capture broadcast audio content that has already been, or is in the process of being, presented audibly, visually, or in some other human perceptible form. Still other embodiments may capture broadcast content prior to the broadcast content actually being reproduced in human perceptible form. In some such implementations, metadata and other computer readable data not intended for presentation to end-users in human perceptible form can be removed from a digital or analog broadcast signal, and the modified digital analyzed to determine a broadcast signature. As used herein, the terms "broadcast signature," "broadcast content signature," "broadcast content fingerprint," and "broadcast content representation," are generally used interchangeably to refer to a spectral or other type of analysis performed on all broadcast content intended to be reproduced in human perceptible form, e.g. audibly, visually, or the like. Generation of a fingerprint, in some embodiments, uses techniques similar to those disclosed and described in U.S. Patent Pub. No. 2008/0205506, entitled, "METHOD FOR DETERMINING THE LIKELIHOOD OF A MATCH BETWEEN SOURCE DATA AND REFERENCE DATA," issued as U.S. Pat. No. 7,386,047, on Aug. 19, 2008, which is incorporated herein by reference in its entirety.

The amount of broadcast content, or length of broadcast signatures, stored in the buffer or other memory can vary depending on the intended use of a specific implementation. For example, an implementation in which a user records a snippet of a broadcast and provides a broadcast signature of that snippet for comparison in near-real-time, might employ field recorders and servers that buffer only approximately 30-60 seconds of broadcast content signatures. In other embodiments, for example where broadcast content is recorded by an end user with a DVR (digital video recorder) and viewed at some later time, a buffer of broadcast content signatures representing multiple days of broadcast content from a particular station can be maintained.

Figure 3:
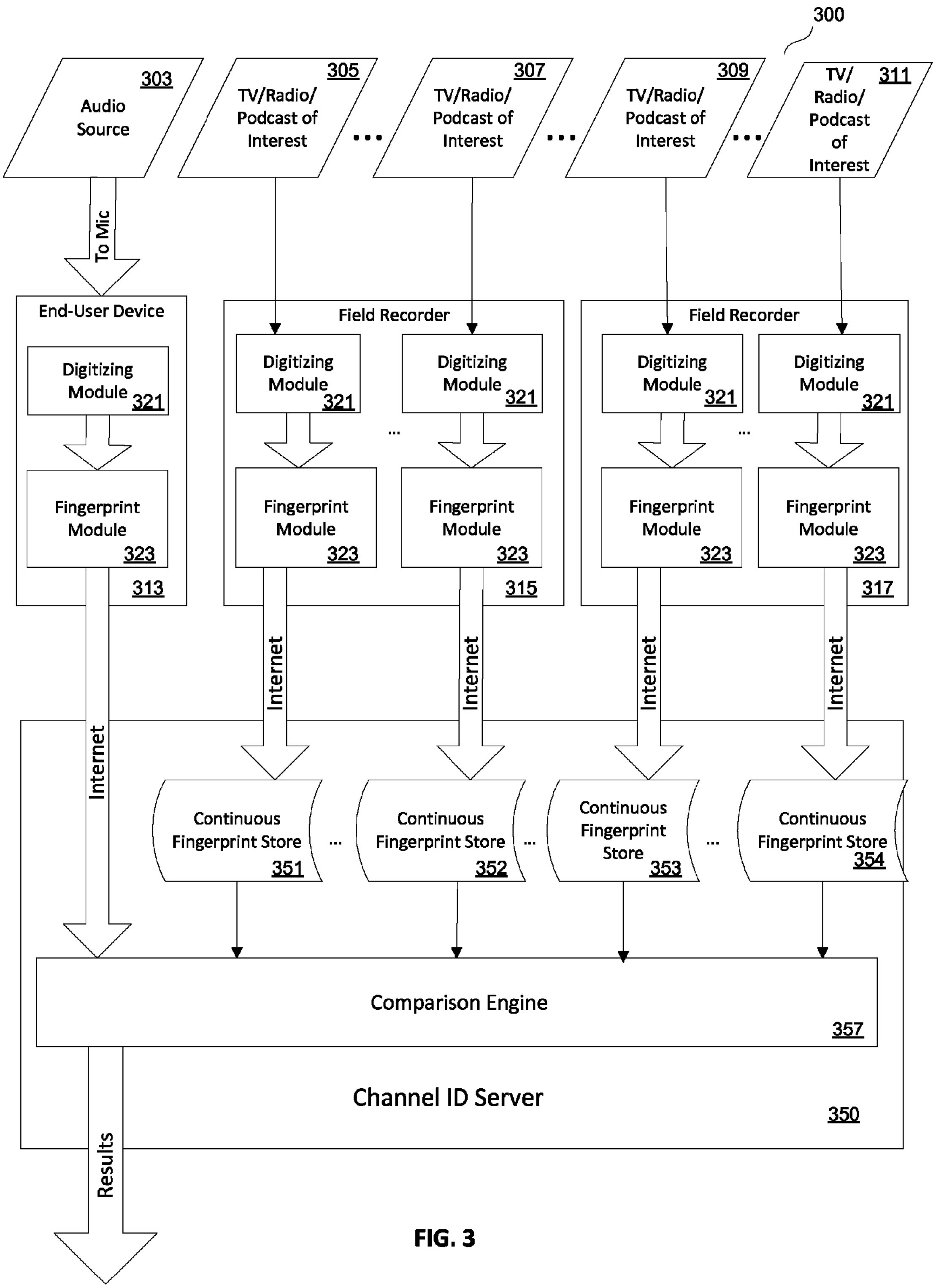
FIG. 3 illustrates a hardware system configured to implement embodiments of the present disclosure.

Referring next to FIG. 3 a system 300 according to various embodiments of the present disclosure is illustrated and discussed. System 300 illustrates an end-user device 313 capable of recording content generated by an audio source 303, and multiple field recorders 315 and 317 capable of obtaining content intended for presentation to users from various TV/radio/podcast of interest sources 305, 307, 309, and 311. System 300 also includes channel ID server 350, which receives content fingerprints from end-user device 313 and field recorders 315 and 317. Channel ID server 350 generates comparison results by matching the content from end-user device 313 field recorders 315 and 317.

End-user device 313 can include a microphone to record an audio source 303 currently being observed or listened to by an end-user. In at least one embodiment, audio source 303 may be a source external to end-user device 313, for example a portable radio, or a radio or television station playing at a store, restaurant, or other venue. In some embodiments, audio source 303 may be included in end-user device 313, such that end-user device 313 actually produces an audible signal from an audio source, such as a radio station, television station, podcast, or the like.

The audible signal produced by audio source 303 can be recorded by a microphone (not illustrated) in end-user device 313. The output of the microphone, which represents broadcast content presented to the user in a human perceptible format, can be delivered to digitizing module 321 where the analog recording is digitized for further analysis by end user device 313. The digitized audio is delivered to fingerprint module 323, which analyzes the digitized audio from digitizing module 321, and generates a fingerprint. In at least some embodiments, this fingerprint is a spectral representation of the broadcast content generated by audio source 303.

The output of fingerprint module 323 can be delivered to channel ID server 350 for comparison with broadcast content representations provided by field recorders 315 and 317. The representation generated by fingerprint module 323, in at least one embodiment, can be delivered to channel ID server 350 via a cellular or telephone network, a wireless data network, a wired data network, a wide-area network, which may include any of various communication networks, such as the Internet.

In at least some embodiments, the output of fingerprint module 323 is delivered to channel ID server 350 in substantially real-time, and may be delivered along with a request from end-user device 313 to identify a station to which audio source 303 is tuned. In other embodiments, no request for station identification is transmitted from end-user device 313, although channel ID server 350 can still be used to identify the source, e.g. the radio or television station or channel, being listened to or otherwise viewed by the end user. In other words, end-user device 313 captures an audible signal generated by audio source 303, digitizes the audio signal in digitizing module 321, converts the digitized audio to a fingerprint in fingerprint module 323, and sends that fingerprint to channel ID server 350.

In some embodiments, the fingerprint of the broadcast audio content transmitted to channel ID server 350 by end-user device 313 corresponds to a predetermined length of broadcast content. For example, end-user device 313 can record 5 seconds of broadcast content from audio source 303, generate a representation of the 5 seconds of audio content, and transmit the representation to channel ID server 350, thereby allowing the representation corresponding to the 5 seconds of broadcast content to be compared with representations of broadcast content received from field recorders 315 and 317. If the representations provided by field recorders 315 and 317 match the representation provided by end-user device 313, channel ID server 350 outputs results indicating the match. In some embodiments, the results generated by channel ID server 350 include the identification of the station that was broadcasting the audio content recorded by both end-user device 313 and field recorders 315 and 317. In other embodiments a flag can be set, or an indicator transmitted, indicating generally, that the source of the 5 second snippet processed by end user device 313 can be identified.

In some embodiments a channel identifier is sent to end-user device 313 for display. The channel identifier can be a station logo, a channel number, station call letters, or another suitable identifier. In some embodiments, the station identifier can be sent to end user device 313, but is not displayed. In some such embodiments, end user device 313 can store the station identifier and use it in conjunction with user profiles or other information to assist in performing searches, to assist in identifying or selecting music, video, or other content, etc.

In some embodiments, channel identifiers may or may not be delivered to end user device 313, and are used in the aggregate. For example, channel identifiers can be collected in a database and used to analyze listenership data for particular channels or stations.

Various embodiments of the present disclosure can identify a broadcast source, and use the identity of the broadcast source to identify a specific media item being listened to by an end user, without resort to a database of known songs, television shows, or other content items. Furthermore, various embodiments do not require timestamps, watermarks, or the like to correlate broadcast content captured, recorded, digitized and analyzed by end-user device 313, with content captured, recorded, digitized and analyzed by field recorders 315 and 317. Instead, the broadcast content received by end-user device can be correlated with broadcast content received by field recorders 315 and 317 at substantially the same time the field recorders and the end user device are receiving the broadcast content. In some implementations, even if there is a delay between the time end user device 313 receives the broadcast content, and the time when channel ID server 350 performs the comparison, or matching, no timestamps, watermarks, or the like are required, because the comparison performed is between two live broadcasts recorded at essentially the same time, rather than between a live broadcast and a database of discreet song signatures.

For example, field recorder 315 can record and process broadcast content received from multiple different TV/radio/podcast of interest sources 305 and 307. Each station 305 and 307 processed by field recorder 315 can be, in some embodiments, processed using separate processing paths, each path including a digitizing module 321 and a fingerprint module 323. In other embodiments, the same hardware can be used to perform separate digitizing and fingerprinting of multiple different stations 305 and 307. For example where processing in the field recorders is performed using a system include a multi-core processor, or multiple processors, multiple different stations can be processed efficiently in parallel. Furthermore, by employing multiple field recorders such as field recorder 315 and 317, fingerprints for numerous different stations 305, 307, 309, and 311 can be generated in parallel.

For each station 305, 307, 309, and 311 being processed, the broadcast content can be digitized in a digitizing module 321, and analyzed and converted to a representation of the digitized audio using fingerprint module 323. The digitizing modules 321 and fingerprint modules 323 included in field recorder 315 and 317 can be implemented in software, hardware, or various commendations thereof.

The output of field recorders 315 and 317 includes representations of broadcast content received from stations 305, 307, 309, and 311, and is transmitted to channel ID server 350 for comparison with representations of broadcast content provided by end user device 313. This comparison allows channel ID server 350 to determine which station 305, 307, 309, and 311, if any, correspond to audio source 303. As illustrated in FIG. 3, system 300 includes channel ID server 350, which in turn includes comparison engine 357 and continuous fingerprint stores 351, 352, 353, and 354. Each of the continuous fingerprint stores 351-354, is used to temporarily store fingerprints received from field recorders, where each fingerprint corresponds to a different station.

In at least one embodiment, comparison engine 357 is used to compare the fingerprint received from end-user device 313 with the fingerprints received from field recorders 315 and 317, thereby facilitating identification of the station to which end-user is listening, in this example audio source 303. The station to which end-user is listening can be identified by various embodiments, because each of the fingerprints stored in the continuous fingerprint store 351-354 corresponds to a fingerprint of substantially all content intended for human perception that was broadcast from stations 305, 307, 309, and 311. The fingerprints stored in continuous fingerprint stores 351-354 can be compared concurrently, simultaneously, or generally at the same time as fingerprints from other continuous fingerprint stores are being compared to the fingerprint received from end-user device 313. In this way, the fingerprint recorded by end-user device 313 can be compared against the fingerprints of numerous different broadcast stations at the same time, thereby speeding the identification of the radio station or other station to which the end-user is listening.

Continuous fingerprint stores 351-354 are, in at least one embodiment, limited time cache memories used to store broadcast content representations from field recorders. Thus, each continuous fingerprint store 351-354 can be used to store, for example, representations corresponding to 30 seconds worth of broadcast content from a particular station. If the fingerprint received from and user device 313 matches the fingerprint of a particular station stored in the continuous fingerprint store 351-354, then comparison engine 357 identifies the station corresponding to the stored continuous fingerprint as the same station listen to by end user device 313.

In some embodiments, field recorders 315 and 317 record audio content with a microphone, in a manner similar to that used by end-user device 313 to record the broadcast content from audio source 303. In other embodiments, field recorders 315 and 317 can include additional modules, software, circuitry, or combinations thereof to enable the field recorders to separate the intended human perceptible content from non-human perceptible content and to generate a spectral analysis, or other representation, of only the human perceptible broadcast content.

For example, digital broadcasts can include metadata such as song titles, and other data in addition to the content intended for human-perceptible presentation to audience members. In some embodiments field recorders, without actually generating audible, visual, or other content intended for perception by a user, can strip off the hidden metadata and other content not intended for presentation to a user, and generate a fingerprint based on substantially only the broadcast content intended for presentation to the user without actually reproducing the human-perceptible content.

It will be appreciated, that although primarily audio content and audio sources are discussed with respect to FIG. 3, other types of broadcast content can be recorded and processed to identify a station being observed by end-user. Thus, if an end-user is watching a particular television station, the broadcast content generated by the television can be recorded by a field recorder and end-user device 313. The broadcast content from the television station can be processed and compared by comparison engine 357 to permit identification of a television station being viewed by the end-user. This identification can be based on either audio content, video content, or some combination thereof. Similar techniques can be applied to identify broadcast stations received by a user over the Internet, podcasts, and the like. Identification based on tactile reproduction of broadcast content can also be performed according to at least one embodiment.

At least one embodiment of the present disclosure contemplates storing a limited quantity of data in continuous fingerprint stores 351-354, so that fingerprints received at channel ID server 350 from end-user device 313 are compared with essentially contemporaneous fingerprints recorded by field recorders 315 317. Thus, the comparison between the fingerprints from end-user device 313 and field recorders 315 317, can be compared in near real-time to provide a substantially current station identification.

In some cases, representations corresponding to an arbitrarily large time period can be stored in continuous fingerprint stores 351-354. Thus, for example, if audio source 303 is recorded by a DVR (not illustrated), and end-user device 313 is used to generate a fingerprint corresponding to a portion of broadcast content from audio source 303 that aired 3 hours prior to be being viewed, sufficient fingerprint data can be stored in one or more of the continuous fingerprint stores 351-354 to permit identification of audio source 303.

Using a continuous fingerprint store to identify a broadcast source differs from using a traditional database holding discrete broadcast elements to identify a discrete content item. Consider the case where an identical song is broadcast on two different radio stations at the same time, but on a first radio station a first disc jockey is talking over the song to announce a contest or prizewinner, while on a second radio station a second disc jockey is fading the song into another song, a spectral analysis of the two radio stations will not be the same, even though the same song is being played on both stations. Comparison of a fingerprint received from the end user device 313 corresponding to the first radio station with a database of pre-stored fingerprints corresponding to discrete content elements would yield no match, because the fingerprint stored in the database would not include a representation of the song plus the voice overlay, or a representation of the song plus the fade. Various embodiments of the present disclosure, however, would yield a match between the fingerprint generated by the end-user device 313 and the fingerprint corresponding to the first radio station.

Figure 4:
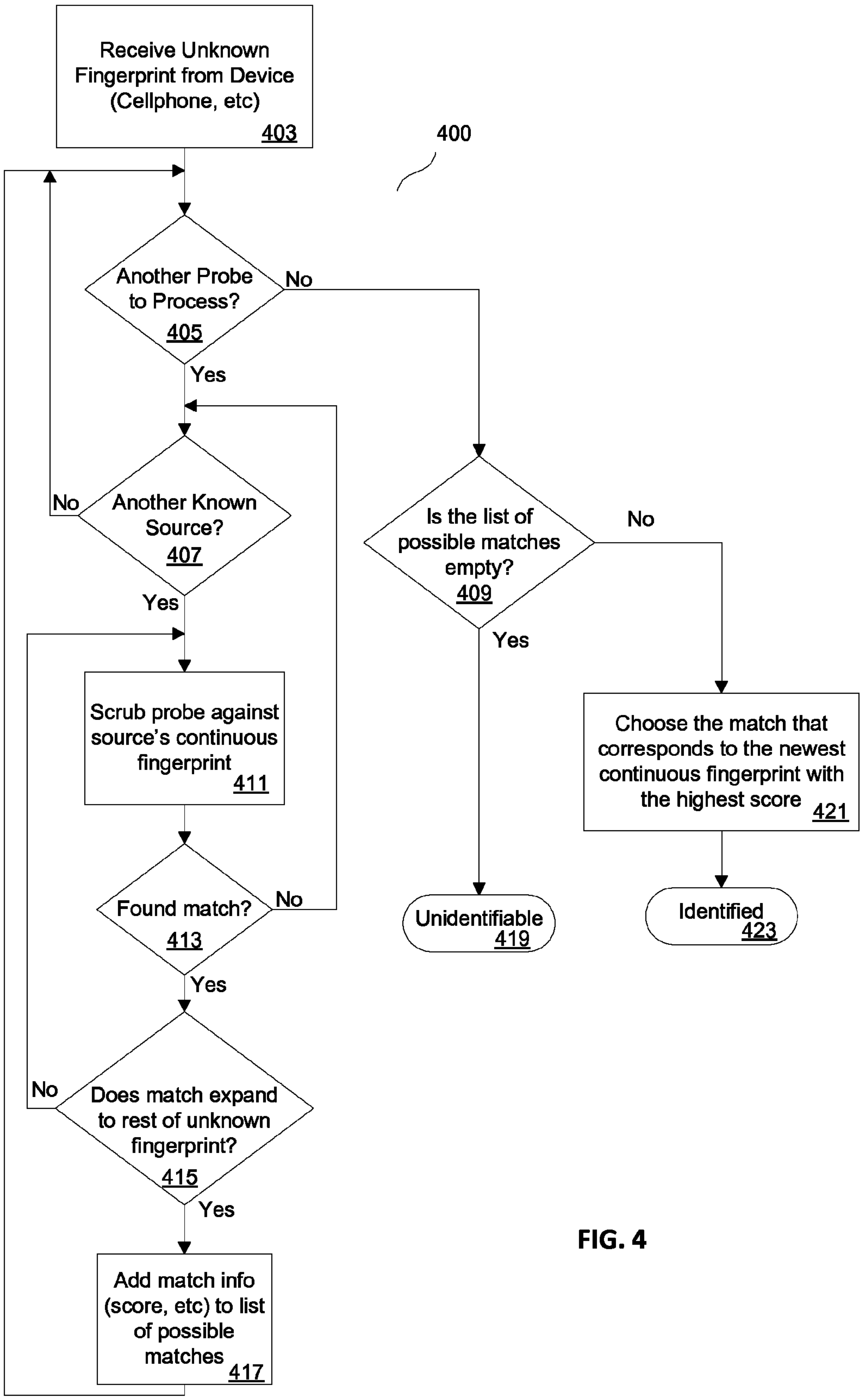
FIG. 4 is a flowchart illustrating a method according to embodiments of the present disclosure.

Referring next to FIG. 4, a method 400 will be discussed according to various embodiments of the present disclosure. As illustrated by block 403 a fingerprint representing a portion of a broadcast obtained from an unknown source, is received from an end user's device. The fingerprint can be conceptually, or actually, broken into smaller pieces called probes.

As illustrated by block 405, a determination is made regarding whether or not there is another probe process. In general, determining whether there is another probe to process refers to determining whether or not another portion of the fingerprint corresponding to the unknown source is to be compared against one or more known fingerprints stored in a continuous fingerprint store, or buffer.

As illustrated by block 407, if there are more probes to process, a determination is made at block 407 regarding whether or not there anymore fingerprints of known sources, against which to compare the fingerprint from the unknown source. If there are no fingerprints from known sources or stations to compare against the unknown fingerprint, the method proceeds back to block 405, where another check is made for additional probes to process.

If there are no more probes to process, and there are no other known sources to compare against the probes, method 400 proceeds to block 409. At block 409, a determination is made about whether the list of possible matches is empty; the list will be empty if no fingerprint from a known source or station had been matched to the fingerprint from the unknown source.

As illustrated by block 419, if no matches have been identified, i.e. the list of possible matches is empty, method 400 labels the fingerprint representing broadcast content from the unknown source as unidentifiable. As illustrated by block 421, if there are one or more potential matches in the list of possible matches, then the newest continuous fingerprint with the highest score is chosen as the best match. Some embodiments employ different criteria to determine the best match.

As illustrated by block 423, after a match has been chosen, method 400 marks the fingerprint from the unknown source as identified. Marking the fingerprint identified can include appending a station identifier to the fingerprint, sending a message to the user indicating the identity of the station he is listening to, sending the user, via a communication network, content selected based on the station identified, or the like.

Referring now to the output of block 407, the case where there are more probes to process and there are additional sources to compare with the unknown fingerprint will be discussed. As illustrated by block 411 the probe, or portion of the unknown fingerprint being processed, is compared against the continuous fingerprint of a known source. As illustrated by block 413, a determination is made regarding whether the probe matches a portion of the known, continuous fingerprint. If no match is found method 400 returns to block 407 to determine if there is another source to compare against the probe.

As illustrated by block 415, if a match is found between a probe and a portion of a known fingerprint, method 400 determines whether the rest of the unknown fingerprint matches the known fingerprint. This is sometimes referred to herein as "expanding the match."

As illustrated by block 417, if there the match between the probe of the unknown fingerprint and the known fingerprint can be expanded to verify that at least a threshold amount of the unknown fingerprint matches the fingerprint from the known source, match information is added to the list of possible matches. The information added to the list of possible matches can include one or more scores or other indicators of how well the fingerprint from the unknown source matches fingerprints from known sources, information about which sources matched, information about a time at which the matched content was being broadcast, the type of content matched, name of content item matched, information related to spots broadcast sponsors and advertisers, information linking the matched content to other content items deemed to be of interest to consumers of the matched content, length of the matched content, links to previously matched content, communication addresses, and the like.

Figure 5:
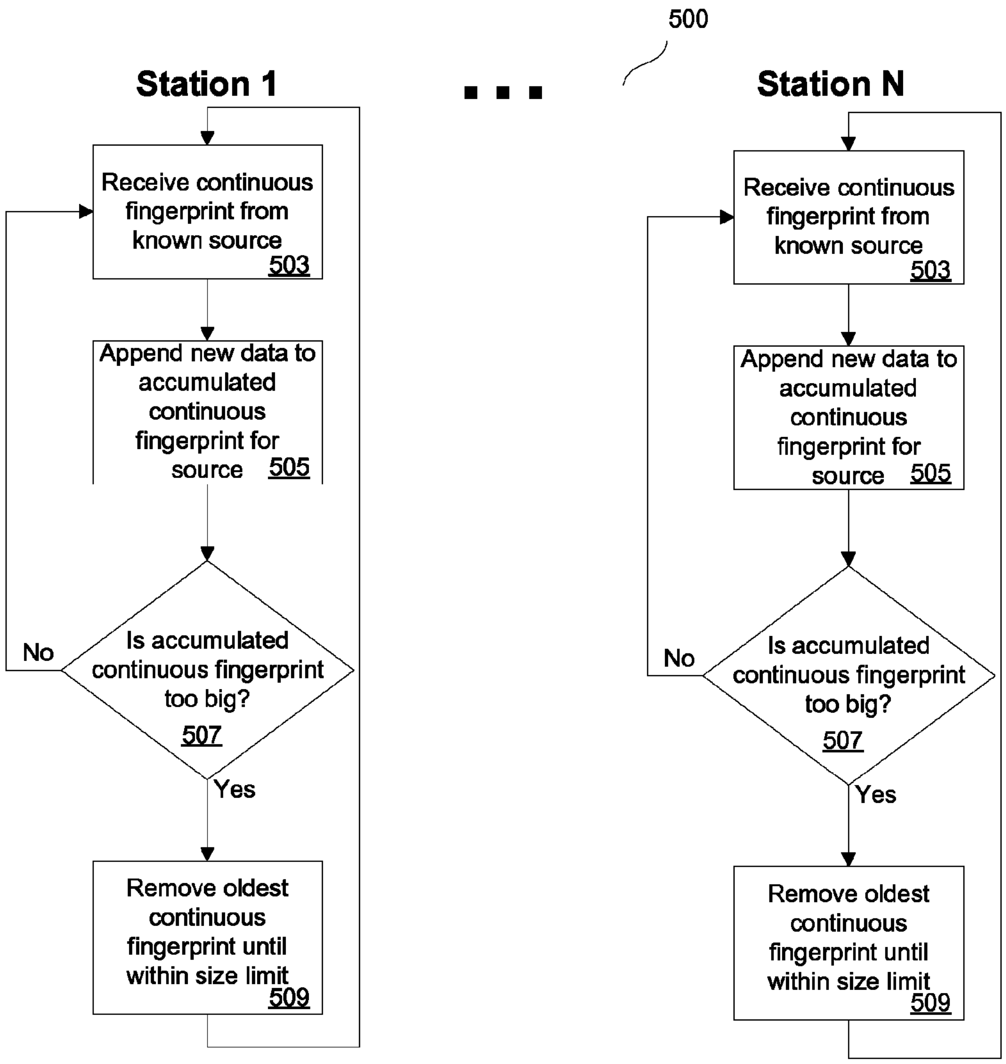
FIG. 5 is a flowchart illustrating parallel storage of broadcast content signatures into buffers, according to various embodiments of the present disclosure.

After adding match information to the list of possible matches, method 400 returns to block 405, and a decision is made regarding whether there is another probe process Referring next to FIG. 5, a method 500 illustrating concurrent, or parallel, accumulation of continuous fingerprints for multiple different broadcast sources is illustrated and discussed. As shown in FIG. 5, stations 1-N can be processed concurrently. At block 503, continuous fingerprints of broadcast content are received from known sources, for example radio or television channels, stations or the like. As illustrated by block 505, new data received from the known source can be appended to previous data received and accumulated in the continuous fingerprint source.

As illustrated by block 507, a check is made to determine whether the accumulated continuous fingerprint exceeds a threshold value established as the maximum size for data storage. In some embodiments for example a maximum size threshold for accumulated continuous fingerprint data can be set to an amount of fingerprint data corresponding to 30 seconds worth of broadcast content. In other embodiments, the threshold for accumulated continuous fingerprint data may be set to correspond to multiple days or weeks of broadcast content. As illustrated by block 509, if there is too much data in the accumulated continuous fingerprint, the oldest continuous fingerprint data can be removed until the accumulated continuous fingerprint buffer falls within the threshold size limit.

Figure 6:
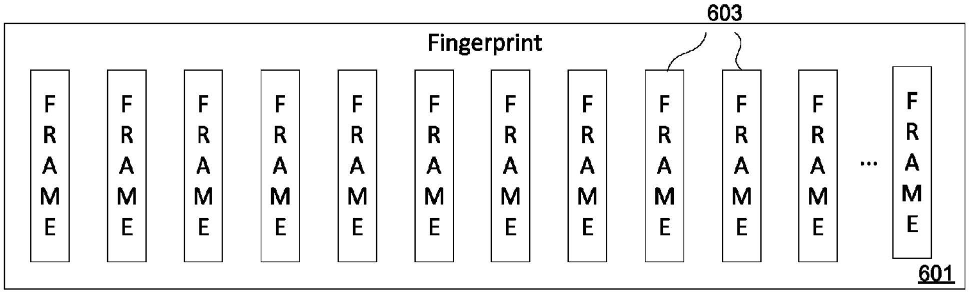
FIGS. 6-7 are diagrams illustrating the organization of fingerprints into frames, and frames into blocks, according to various embodiments of the present disclosure.
Figure 7:
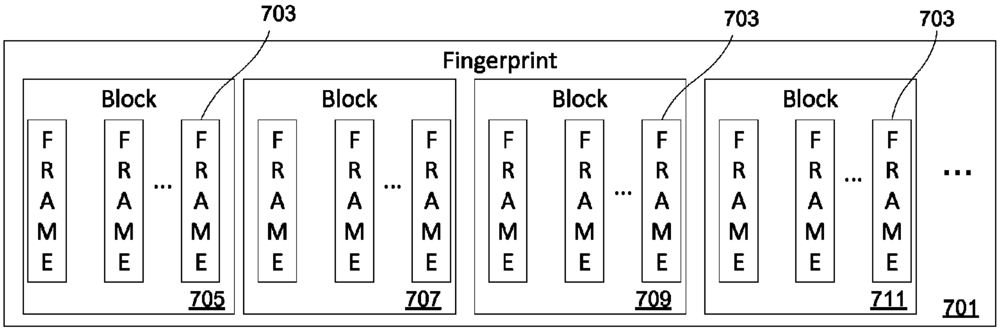

Referring next to FIGS. 6-7, a fingerprint such as that generated by either an end-user device (for example, mobile device 105 of FIG. 1) or a field recorder (for example, field recorders 104 of FIG. 1) is illustrated and discussed. In FIG. 6, a fingerprint 601 is shown logically, or in some cases physically, segmented into a number of frames 603. Different embodiments use different numbers of frames, and the number of frames 603 can be chosen based on the type of processing system, time constraints, or the accuracy desired. In at least one embodiment, a fingerprint consists of one 48 bit number for each 1/10th of a second of audio, in chronological order.

FIG. 7 illustrates a fingerprint 701, which has been divided into multiple frames 703, and the frames 703 have been grouped into blocks 705, 707, 709, and 711. In at least one embodiment a fingerprint being compared to another fingerprint may be expected to be "stretched" in time relative to one another. To compensate for this expected time stretch, the number of frames in each block is chosen to be the number of frames before a one-frame offset between the two fingerprints. For example, a 16 frame block corresponds to a maximum expected time-stretch of 6.25%, which has been empirically identified as a good choice for radio.

Figure 8:
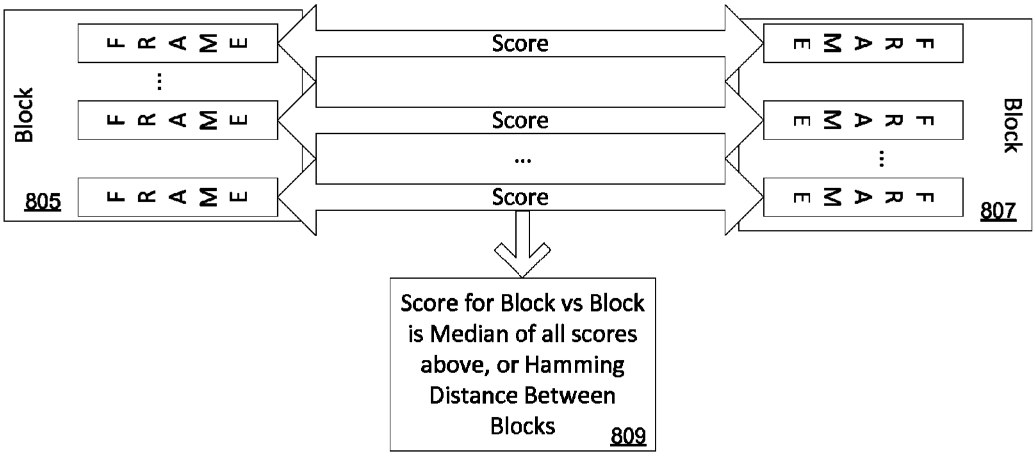
FIG. 8 is a diagram illustrating block by block scoring used in identifying matching broadcast content, according to various embodiments of the present disclosure.

As illustrated by FIG. 8, a score for each block 805 of an unknown fingerprint is compared against each block 807 of a known fingerprint by comparing each frame of block 805 against each from of block 807. The scores for each frame by frame comparison are then used to determine a block vs. block score 809. In at least one embodiment, the block vs. block score can be computed using the median, or another $k^{th}$ order function, of the individual frame vs. frame scores.

In some instances, the Hamming distance between two blocks can be used as a score in addition to, or in place of, a score computed using the computed median or other $k^{th}$ order function. The Hamming distance, as the term is used herein, generally refers to a measure of the number of substitutions required to change one block to the other, or the number of errors that could have caused one block to be transformed to the other. Use of the Hamming distance as a score indicating how likely it is that two blocks are actually the same block of content can be implemented in various ways. For example, in some embodiments, if all but two frames within each block are identical, then the Hamming distance can be considered to be two. In some embodiments, the Hamming distance between each frame being compared can also be used, so that in cases where no frame is identical to another frame, two frames can still be said to match if the Hamming distance is less than a threshold value. In other embodiments, the bits of two blocks are compared with each other as a whole, regardless of frame boundaries, and all differences between the two blocks are used to determine the Hamming distance score. In yet other embodiments, all of the bits from two blocks can be compared, with various weighting factors applied based on whether bit differences occur within corresponding frames.

The Hamming distance between two blocks can be determined as follows. Assume that each frame includes exactly 8 bits set "on". It follows, therefore, that the number of bits "on" in a block equals the number of frames in the block multiplied by 8 (the number of bits "on" in each frame). Thus, for a block size of 16 frames, for example, there would be 8×16=128 bits turned "on" (the other 40×16=640 bits would be turned "off") .

A block used in the present example can be conceptualized as a 16×48 grid, where each 48 bit high column has 40 zeroes and 8 ones distributed throughout. If two of these 16×48 grids (each one representing a block) are overlaid, one on top of the other, between zero and 128 ones will overlap. The number of overlaps is the Hamming distance, which various embodiments use as a score of how well the two blocks match. In this example, 128 overlaps would be a perfect match, with the two blocks being identical.

Figure 9:
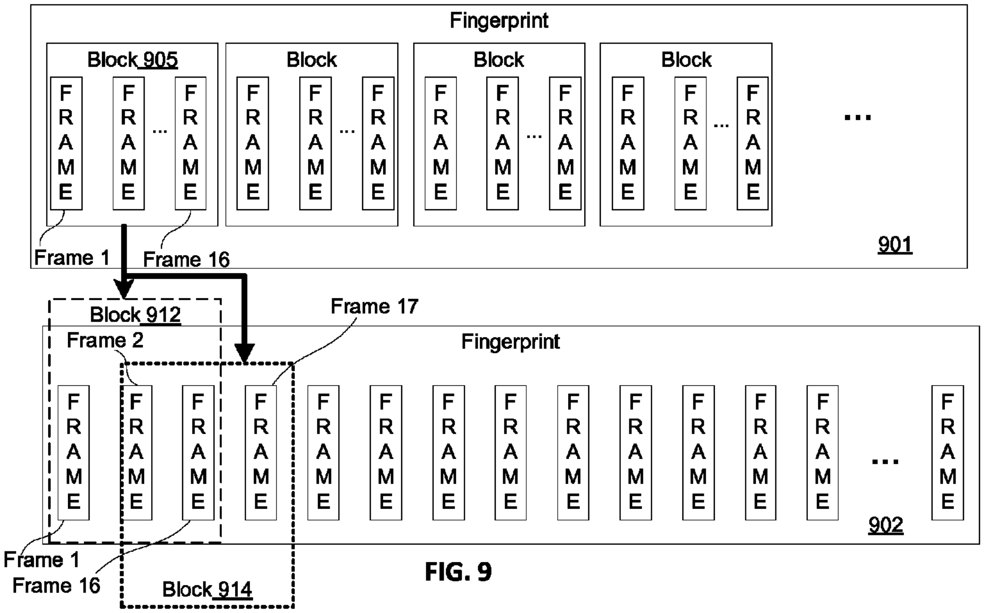
FIG. 9 is a diagram illustrating scrubbing a probe from an unknown fingerprint against a known fingerprint, according to various embodiments of the present disclosure.

Referring next to FIG. 9, comparing a probe of a fingerprint from an unknown broadcast source against a fingerprint from a known broadcast source will be discussed according to embodiments of the present disclosure. To "scrub a probe" from one fingerprint against another means that one segment of the fingerprint being identified, which in the illustrated embodiment is a block, is matched against each possible block of the other fingerprint, on a frame by frame boundary, against the other fingerprint until either the comparison yields a score that exceeds a threshold value, or a determination is made that the probe does not match.

For example, block 905 of fingerprint 90, which in this example includes 16 frames, is compared and scored against each possible block of 16 sequential frames of fingerprint 902 until the match score exceeds a threshold value indicating that the two blocks being compared might be a match. Thus, block 905 is compared first against block 912, then against block 914, and so on until a potential match is found, or until there are no more blocks to compare. Multiple block comparisons can be performed concurrently, rather than sequentially. The result of the scrub are the positions of two blocks, one from the unknown fingerprint and one from the known fingerprint, that match each other well.

Figure 10:
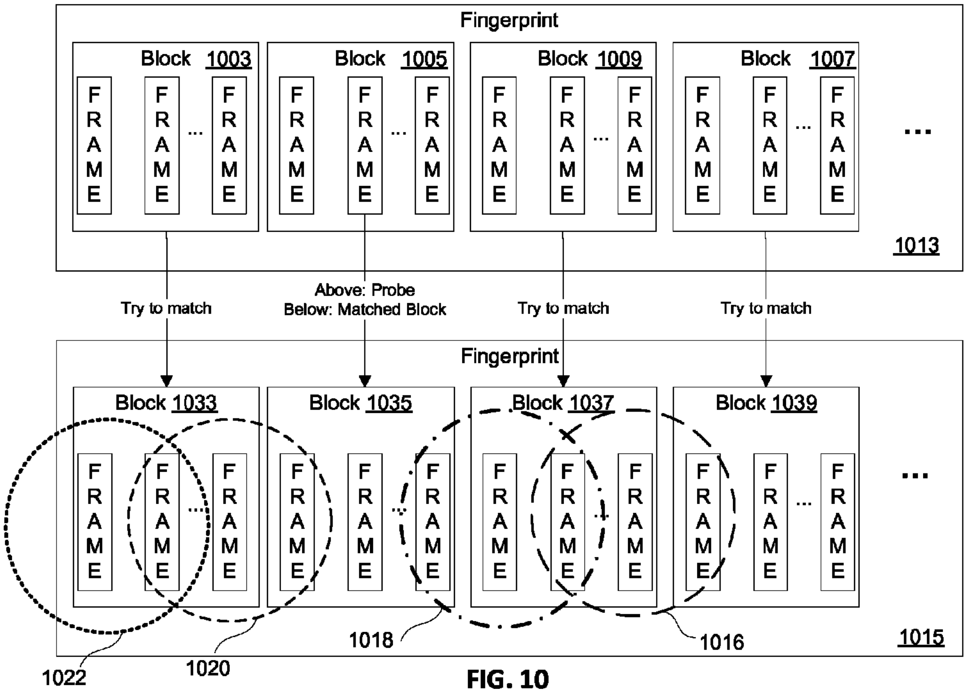
FIG. 10 illustrates growing a matching block to identify an unknown fingerprint, according to various embodiments of the present disclosure.

Referring next to FIG. 10, growing the matched probe according to various embodiments will be discussed. Once two matching blocks have been identified, an attempt to grow the match is made by taking the block prior the probe and the block after the probe, and scoring those blocks against the corresponding blocks in the target fingerprint as well as the blocks defined by starting one frame earlier and one frame later.

Content from the unknown broadcast source may be time stretched longer, or time stretched shorter, so some embodiments implementing the matching process account for the time stretch by occasionally either skipping a tick in the target or matching it twice. The time stretching may be intentional, as in a radio station squeezing or stretching a song to hit an exact time marker, or unintentional such as the clock in the analog to digital converter being off specification.

To compensate for a time stretch difference between a reference and a target, some implementations attempt three different matches, and declare that a synchronization point in the target corresponds to the best scoring of the three attempted matches. By matching a 16-frame block from the reference to three pieces of the target, e.g. the 16 frames at the expected matching location as well as the 16 frames starting one frame earlier and one frame later. In this way, when a probe from the dead center of the reference matches the dead center of the target, the blocks of ticks at either end of the reference can match target ticks that are up to a predetermined distance away from where we would expect them to be if the audio was perfectly speed-synced between the reference and the target. In at least one embodiment, the predetermined distance is about 6.25%.

For example, in assume that blocks 1005 and 1035 were identified as matching blocks by the procedure illustrated in FIG. 9. In some embodiments, Block 1003 is scored against block 1033, shifted block 1022, and shifted block 1020. The best of the three scores is selected, and defines the location for the next block to grow to. Block 1009 is scored against block 1039, and shifted blocks 1018 and 1016 in a similar manner. Growth of the match is continued in each direction until the end of the fingerprint is reached, or until the scores fall below a threshold.

Consider, for example, the situation where a listening device encodes a station change. A score computed for each 16 frame block from the reference to the target might yield a progression of scores that run: high, high, high . . . low, low, low . . . . Various embodiments can conclude that the drop in scores was consistent with the reference station only for the length of high scoring matches, but not for the entire duration of the sample.

Figure 11:
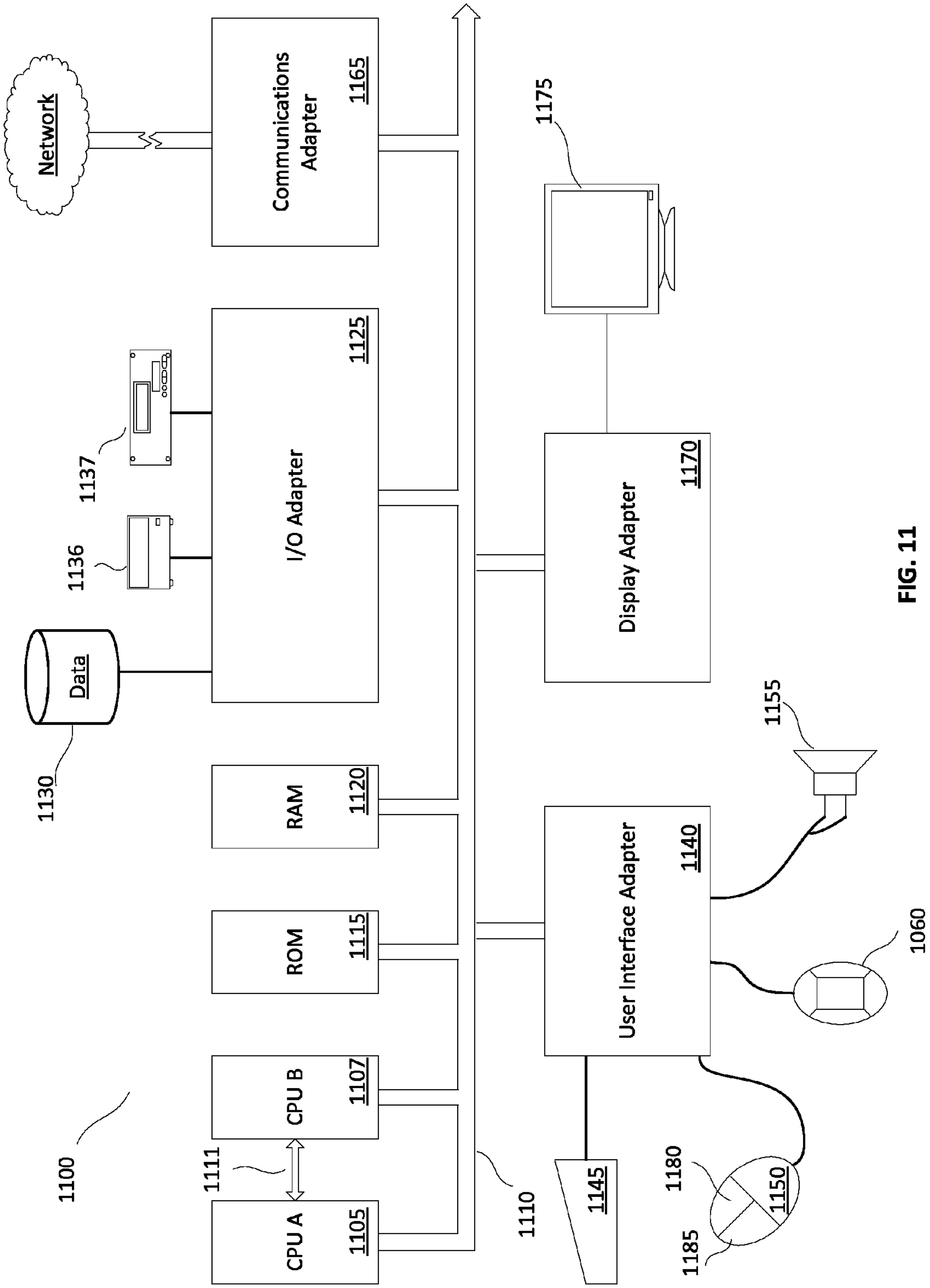
FIG. 11 is a high level block diagram of a processing system, such as a server, according to an embodiment of the present disclosure.

Referring now to FIG. 11, a high-level block diagram of a processing system is illustrated and discussed. Processing system 1100 includes one or more central processing units, such as CPU A 1105 and CPU B 1107, which may be conventional microprocessors interconnected with various other units via at least one system bus 1110. CPU A 1105 and CPU B 1107 may be separate cores of an individual, multi-core processor, or individual processors connected via a specialized bus 1111. In some embodiments, CPU A 1105 or CPU B 1107 may be a specialized processor, such as a graphics processor, other co-processor, or the like.

Processing system 1100 includes random access memory (RAM) 1120; read-only memory (ROM) 1115, wherein the ROM 1115 could also be erasable programmable read-only memory (EPROM) or electrically erasable programmable read-only memory (EEPROM); and input/output (I/O) adapter 1125, for connecting peripheral devices such as disk units 1130, optical drive 1136, or tape drive 1137 to system bus 1110; a user interface adapter 1140 for connecting keyboard 1145, mouse 1150, speaker 1155, microphone 1160, or other user interface devices to system bus 1110; communications adapter 1165 for connecting processing system 1100 to an information network such as the Internet or any of various local area networks, wide area networks, telephone networks, or the like; and display adapter 1170 for connecting system bus 1110 to a display device such as monitor 1175. Mouse 1150 has a series of buttons 1180, 1185 and may be used to control a cursor shown on monitor 1175.

It will be understood that processing system 1100 may include other suitable data processing systems without departing from the scope of the present disclosure. For example, processing system 1100 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any tangible apparatus or device that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described for identifying an unknown broadcast source based on comparison of a representation of the broadcast source with a representation of a known continuous broadcast source. Other variations and modifications of the embodiments disclosed may be made based on the description provided, without departing from the scope of the invention as set forth in the following claims.

What is claimed is:

1. A method comprising:

generating a plurality of fingerprint stores at a channel identification server, wherein different fingerprint stores of the plurality of fingerprint stores store digital fingerprints representing substantially current broadcast content associated with different broadcast sources;

dividing each of the digital fingerprints into a plurality of blocks that each include one or more frames of the each of the digital fingerprints;

performing a first comparison comparing each frame included in a first block of a first digital fingerprint to each frame included in a first block of a second digital fingerprint, wherein the second digital fingerprint is associated with an unknown broadcast source;

computing a block versus block score based on the first comparison;

determining a Hamming distance associated with differences between the first block of the first digital fingerprint and the first block of the second digital fingerprint;

determining, based on the Hamming distance and the block versus block score, that the broadcast content associated with one of the different broadcast sources matches the broadcast content associated with another of the different broadcast sources if the Hamming distance is less than a threshold value;

identifying the unknown broadcast source based on the match; and generating, by the channel identification server, a channel identifier for the unknown broadcast source.

2. The method of claim 1, wherein generating the plurality of fingerprint stores comprises:

generating spectral data intended for human-perceptible reproduction for substantially all broadcast content associated with respective different broadcast sources.

3. The method of claim 1, wherein the generating the plurality of fingerprint stores comprises:

accumulating continuous fingerprint data in a fingerprint store until the fingerprint store exceeds a size threshold; and removing oldest continuous fingerprint data until the fingerprint store reaches a size limit.

4. The method of claim 3, further comprising:

generating block-level scores based on the first comparison.

5. The method of claim 4, further comprising:

determining that a first block of the plurality of blocks matches a second block of the plurality of blocks; and growing the match to include more than two blocks of the plurality of blocks.

6. The method of claim 1, wherein the one or more frames of the each of the digital fingerprints further comprises:

grouping a set number of frames of fingerprint data into the plurality of blocks.

7. The method of claim 6, wherein the set number of frames to be included in the plurality of blocks of fingerprint data is selected to account for an expected time stretch between broadcast content in the plurality of fingerprint stores.

8. A device comprising:

a processor;

memory operably associated with the processor;

a program of instructions configured to be stored in the memory and executed by the processor, the program of instructions including:

at least one instruction to generate a plurality of fingerprint stores at a channel identification server, wherein different fingerprint stores of the plurality of fingerprint stores store digital fingerprints representing substantially current broadcast content associated with different broadcast sources;

at least one instruction to divide each of the digital fingerprints include one or more frames of the;

at least one instruction to divide each of the digital fingerprints into a plurality of frames;

at least one instruction to group the plurality of frames into one or more blocks;

at least one instruction to compare, on a block basis, digital fingerprints of an unknown broadcast source with each of the other different fingerprint stores to determine a Hamming distance associated with differences between at least one of the plurality of fingerprint stores and the digital fingerprints of the unknown broadcast source;

at least one instruction to determine, based on the Hamming distance, that the broadcast content associated with one of the different broadcast sources matches the broadcast content associated with another of the different broadcast sources if the Hamming distance is less than a threshold value;

at least one instruction to identify the one of the different broadcast source based on the match; and at least one instruction to generate, by the channel identification server, a channel identifier for the one of the different broadcast sources.

9. The device of claim 8, wherein the at least one instruction to generate the plurality of fingerprint stores further comprises:

at least one instruction to generate spectral data intended for human-perceptible reproduction for substantially all broadcast content associated with respective different broadcast sources.

10. The device of claim 8, wherein the at least one instruction to generate further comprises:

at least one instruction to accumulate continuous fingerprint data in a fingerprint store until the fingerprint store exceeds a size threshold; and at least one instruction to remove oldest continuous fingerprint data until the fingerprint store reaches a size limit.

11. The device of claim 8, wherein the at least one instruction to compare further comprises:

at least one instruction to determine that a first block of the plurality of blocks matches a second block of the plurality of blocks; and at least one instruction to grow the match to include more than two blocks of the plurality of blocks.

12. The device of claim 8, wherein the one or more frames of the each of the digital fingerprints further comprises:

at least one instruction to group a set number of frames of fingerprint data into the plurality of blocks.

13. The device of claim 12, wherein the set number of frames to be included in a block of fingerprint data is selected to account for expected time stretch between broadcast content in the plurality of fingerprint stores.

14. A method comprising:

capturing an audible signal generated by an unknown broadcast source;

digitizing the audible signal to produce digital fingerprints of the unknown broadcast source;

generating a plurality of fingerprint stores at a channel identification server, wherein different fingerprint stores of the plurality of fingerprint stores store digital fingerprints representing substantially current broadcast content associated with different broadcast sources;

segmenting the digital fingerprints of the plurality of fingerprint stores and the digital fingerprints of the unknown broadcast source into a number of frames;

grouping a first set of frames for each of the digital fingerprints of the plurality of fingerprint stores into a first respective block and a second set of frames for the digital fingerprints for the unknown broadcast source into a second respective block;

comparing the digital fingerprints of the each of the plurality of fingerprint stores with each other on a block-by-block basis of the first respective block and the second respective block to determine a Hamming distance associated with differences between at least one of the plurality of fingerprint stores and the digital fingerprints of the unknown broadcast source;

determining that a match exists, based on the Hamming distance, in response to the broadcast content associated with one of the different broadcast sources matching the broadcast content associated with another of the different broadcast sources if the Hamming distance is less than a threshold value;

identifying the one of the different broadcast sources based on the match; and generating, by the channel identification server, a channel identifier for the one of the different broadcast sources.

15. The method of claim 14, wherein generating the plurality of fingerprint stores comprises:

generating spectral data intended for human-perceptible reproduction for substantially all broadcast content associated with respective different broadcast sources.

16. The method of claim 14, wherein the generating the plurality of fingerprint stores comprises:

accumulating continuous digital fingerprint data in a fingerprint store until the fingerprint store exceeds a size threshold; and removing oldest continuous digital fingerprint data until the fingerprint store reaches a size limit.

17. The method of claim 16, wherein:

the comparing includes comparing Hamming code scores the digital fingerprint data at a block level to produce a block-versus-block score.

18. The method of claim 17, further comprising:

determining that the first block matches the second block based on the block-versus-block score; and growing the match to include more than two blocks.

19. The method of claim 14, wherein either of the first set of frames and the second set of frames to be included in a corresponding first and second block of digital fingerprint data is selected to account for expected time stretch between broadcast content in the plurality of fingerprint stores.

* * * * *